US007907708B2

(12) United States Patent
Walker et al.

(10) Patent No.: US 7,907,708 B2
(45) Date of Patent: Mar. 15, 2011

(54) VOICE AND FAX OVER IP CALL ESTABLISHMENT IN A COMMUNICATIONS NETWORK

(75) Inventors: Dominic Walker, Stevenage (GB); Graeme Gibbs, Saffron Walden (GB)

(73) Assignee: Genband US LLC, Plano, TX (US)

( * ) Notice: Subject to any disclaimer, the term of this patent is extended or adjusted under 35 U.S.C. 154(b) by 1531 days.

(21) Appl. No.: 10/164,524

(22) Filed: Jun. 6, 2002

(65) Prior Publication Data
US 2003/0193696 A1 Oct. 16, 2003

(30) Foreign Application Priority Data

Jan. 24, 2002 (GB) .................................. 0201588.1

(51) Int. Cl.
*H04M 11/00* (2006.01)
(52) U.S. Cl. ............ 379/93.09; 379/93.14; 379/100.15; 358/1.15; 358/434
(58) Field of Classification Search .................. 358/400, 358/1.15, 407, 434; 370/352, 493; 375/240; 379/100, 93.09, 93.14, 100.15; 718/104, 718/106, 107, 108
See application file for complete search history.

(56) References Cited

U.S. PATENT DOCUMENTS

| | | | | |
|---|---|---|---|---|
| 6,075,847 A * | 6/2000 | Leung | ....................... | 379/100.17 |
| 6,314,112 B1 * | 11/2001 | Hsu et al. | ....................... | 370/477 |
| 6,512,790 B1 * | 1/2003 | Sourani | ......................... | 375/240 |
| 7,305,676 B1 * | 12/2007 | Boll et al. | ..................... | 718/107 |
| 2001/0022784 A1 * | 9/2001 | Menon et al. | ................. | 370/352 |
| 2003/0002476 A1 * | 1/2003 | Chung et al. | .................. | 370/352 |
| 2003/0123097 A1 * | 7/2003 | Fruth | ............................ | 358/400 |
| 2004/0125791 A1 * | 7/2004 | Hoffmann | ..................... | 370/352 |

OTHER PUBLICATIONS

Parsons, "Real-time Facsimile (T.38)- image/t38 MIME Sub-type Registration," RFC 3362, pp. 1-5 (Aug. 2002).
"H.248.1 Call Establishment Procedures," Annex E, pp. 1-12 (Mar. 2002).
Schulzrinne et al., "RTP Payload for DTMF Digits, Telephony Tones and Telephony Signals," RFC 2833, pp. 1-30 (May 2000).
Handley et al., "SDP: Session Description Protocol," RFC 2327, pp. 1-42 (Apr. 1998).

* cited by examiner

*Primary Examiner* — Edward L Coles
*Assistant Examiner* — Vu B Hang
(74) *Attorney, Agent, or Firm* — Jenkins, Wilson, Taylor & Hunt, P.A.

(57) ABSTRACT

In a communications network, voice and facsimile calls are established between first and second and second terminals via first and second media gateways in a communications network. Each gateway is capable of autonomous transitioning between a voice over IP (VoIP) call mode and a facsimile over IP (FoIP) call mode. A bearer path for the call is established via a media gateway controller. During call setup, the media gateways exchange confirmation of each gateway's capability to perform autonomous transitioning between VoIP and FoIP call modes. The call is established as a VoIP call, and, on a determination by the media gateways that a facsimile call is required, each media gateway autonomously transitions between its VoIP and FoIP call modes without the intervention of the media gateway controller.

14 Claims, 6 Drawing Sheets

Figure 1: Decomposed Gateway Model where Media Gateways (MG) support FoIP & VoIP.

| | KEY |
|---|---|
| T | T.38 is mutually supported between the two gateways |
| U | "Up speed negotiated": Means when the attribute vbcTransport (under the Nsta/n Vgs Brag/m component) is set to either:<br>• useTone2100Rate (i.e. always up speed to 64 kbit/s G.711 Codec irrespective of whether or not remote gateway supports G.711 (A-law or Mu-law).<br>• useTone2100RateIfNegotiated AND the peer gateway has indicated its capability to support G.711 (A-law or Mu-law). |
| V | the attribute v34OverVBD (under the Nsta/n Vgs Brag/m component) is set to enable. |
| 2100 Hz | Represents a 2100 Hz CED tone (T.30), ANS (V.25) or ANSam (V.8) tone. The gateway does not distinguish between these tones. |
| CNG | Represents the 1100 Hz Calling tone defined in ITU-T Recommendation T.30. CNG(ingr) = detected from TDM network. CNG(egr) = detected from packet network. |
| G711 | The current selected Codec is not G.711. |
| AnyT38 | Means any valid UDP packet received at gateway's T.38 UDP, after source IP address filtering, that is assumed to be a T.38 packet. |
| V21PA | V.21 preamble (i.e. the T.30 HDLC preamble flag modulated using V.21 Channel No. 2 scheme) only detected from the TDM network. |
| T30_ind(x) | Is the T.38 (i.e. IP/UDP/UDPTL) packet of type T30_Indicator used to indicate to the peer gateway detection of signals(represented by x) such as CED, V.21 preamble, CNG and modem modulation rates. |
| Baudot | Baudot frequencies 1400 Hz or 1800 Hz were detected only from the TDM network. |
| Bell 103 | 1070 Hz or 2225 Hz frequencies were detected only from the TDM network. |
| BDT/V.21(L) | V.21 Channel No.1 (Low), 980 Hz or 1180 Hz where detected only from the TDM network. These are sent by V.21, V.8, V.18, and BDT terminals, in PCR 4.2, the PVG cannot distinguish between them. |
| V.22(ingr) | The V.22 Unscrambled Binary 1 frequencies where detected only from the TDM network. |
| V.23(ingr) | 1300 Hz tone was detected only from the TDM network |
| SDP (m=image only) | Means that an SDP was received containing either two media lines such that "m=audio 0 RTP/AVP...." AND "m=image <t38 udp port> nudp t138" or only one media line of type image, i.e. "m=image <t38 udp port> udp t138" (i.e. no audio media line and T.38 udp port != 0) |
| SDP (m=audio only) | Means that an SDP was received containing either two media lines such that "m=audio <udp port> RTP/AVP...." AND "m=image 0 udp t38" or only one media line of type audio i.e. "m=audio <udp port> RTP/AVP...." (i.e. no image media line and audio udp port != 0) |
| & | Boolean operator AND |
| + | Boolean operator OR |
| _ | "underline" : means Boolean NOT (e.g. V means v34OverVBD disabled, T means T.38 is not mutually supported). |

Fig. 4

Voice to Fax call with H.248 endpoints that support Autonomous transition between VoIP & FoIP Fig. 5
Voice to Fax call setup with H.248 and H.323 endpoints that support T.38 Autonomous transition between VoIP & FoIP

VOICE AND FAX OVER IP CALL ESTABLISHMENT IN A COMMUNICATIONS NETWORK

FIELD OF THE INVENTION

This invention relates to arrangements and methods for establishing voice over IP (VoIP) calls and facsimile over IP (FoIP) calls in a communications network.

BACKGROUND OF THE INVENTION

An increasing volume of communications traffic is being transported over Internet Protocol (IP) networks. In a typical arrangement, user terminals connected to respective local networks (PSTN) are provided with communications links over an IP network via media gateways which form an interface between each PSTN and an IP network. The media gateways handle all the bearer traffic switching, media adaptation (Time Division Multiplex and Internet Protocol conversion) and voice services (compression, echo cancellation, announcements, etc.). The gateways are controlled by a media gateway controller which handles all the call signalling (e.g. SS7, H.248, etc) and control functionality.

Calls between terminals will either be voice calls, fax calls or modem calls. When a call is being set up, the system does not 'know' what type of call is to be established, and therefore an assumption is made that a voice call is intended. Once a path over the IP network between the media gateways has been established, the call can commence, at which point it becomes apparent whether a voice, fax or modem connection is required. If a fax or modem call is intended, the calling terminal sends a tone characteristic of that type of call. This tone is recognised by the media gateways which, in response, send messages to the media gateway controller. The media gateway controller then instructs the media gateways to transition to the appropriate type of call. Thus, intervention by the media gateway controller is required both at the initial call set up and for any subsequent transition from the voice call mode e.g. to the fax mode. This of course requires message exchanges between the media gateway controller and the media gateways leading to congestion and delay under busy conditions.

A particular problem can arise between manual single page (G3FE) fax terminals in which, during a facsimile connection, the terminals go to voice and then back to fax. In such cases, the media gateways inform the media gateway controller of every tone and let the media gateway controller decide when to transition from voice to fax (for the case of H.248) or renegotiate support of fax between the media gateways (as is the case of H.323 annex D or SIP MGs as described in Rec. T.38 annex D). If this communication is carried over networks that are lossy and/or have considerable delay, the fax terminals may time out thus preventing the set up of the FoIP call.

Further, every time a media gateway sends a tone notification message (e.g. indicating that a CNG, CED or V21 preamble was detected) to the H.248 media gateway controller, the media gateway controller responds with an ACK message and, maybe, a new message (i.e. a Modify message) in which the T.38 capabilities are renegotiated between the media gateway via the media gateway controller. It any of these messages are lost, corrupted or heavily delayed, the message is resent after a set time (which cannot be to short, to avoid unnecessary messages being sent due previous messages being delayed), which together with the normal delay of an IP network can exceed the fax terminal G3FE timers resulting in the T.38 fax call being aborted. The delay between T.38 transitioning related messages is increased if the messages have to be exchanged between different media gateway controllers that may support different call control protocols and be located physically at a distance and connected by an IP network.

OBJECT OF THE INVENTION

An object of the invention is to overcome or at least to mitigate the above disadvantages.

A further object of the invention is to provide an improved method of transitioning between voice and facsimile calls in a communications network.

Another object of the invention is to provide an improved media gateway for processing voice and facsimile calls.

SUMMARY OF THE INVENTION

According to a first aspect of the invention there is provided a method of establishing a call between first and second media gateways in a communications IP network, the method comprising the steps of: establishing via a media gateway controller voice over IP and fax over IP channels between the media gateways, establishing the call initially as a voice call over the voice channel, and, on a determination by the gateways that a facsimile call is required, muting said voice channel and enabling said FoIP channel.

In a preferred embodiment, voice and facsimile calls are established between first and second terminals via first and second media gateways. Each gateway is capable of autonomous transitioning between a voice over IP (VoIP) call mode and a facsimile over IP (FoIP) call mode. A bearer path for the call is established via a media gateway controller. During call setup, the media gateways exchange confirmation of each gateway's capability to perform autonomous transitioning between VoIP and FoIP call modes. The call is established as a VoIP call, and, on a determination by the media gateways that a facsimile call is required, each media gateway autonomously transitions between its VoIP and FoIP call modes without the intervention of the media gateway controller.

The method enables the autonomous transitioning by the gateways between a VoIP call and a FoIP call without the intervention of a media gateway controller.

In a preferred embodiment of the invention, the media gateways exchange capabilities at call setup indicating their support (or non-support) of the autonomous transitioning method.

Advantageously, the call is established as a voice call over the voice connection, and, on a determination by the gateways that a facsimile call is required, the voice connection is muted and the FoIP connection is enabled by the gateways without intervention by the media gateway controller.

The media gateways are thus enabled to easily and quickly transition between VoIP mode and FoIP (e.g. T38) mode by muting the audio connection while transmitting the facsimile data via T.38, and then muting the T.38 (image/T38) connection, while transmitting audio, and so forth. This operation is performed by the media gateways themselves without the need for intervention by a media gateway controller as the connection is initially set-up as both audio and image/T38.

According to another aspect of the invention there is provided a method of establishing a call between first and second and second terminals via first and second media gateways in a communications network, said gateways each being capable of autonomous transitioning between a voice over IP (VoIP) call mode and a facsimile over IP (FoIP) call mode, the method comprising the steps of: establishing via a media gateway controller a bearer path for the call, exchanging between the media gateways confirmation of each gateway's capability to perform autonomous transitioning between VoIP and FoIP call modes, establishing the call as a VoIP call, and wherein, on a determination by the media gateways that a facsimile call is required, each media gateway autonomously transitions between its VoIP and FoIP call modes without the intervention of the media gateway controller.

According to another aspect of the invention there is provided a media gateway for establishing voice and facsimile calls over an Internet Protocol (IP) network the gateway being arranged to autonomously transition between a VoIP call and a FoIP call without the intervention of a media gateway controller.

According to another aspect of the invention there is provided a method of establishing voice over IP (VoIP) calls and facsimile over IF (FoIP) calls between first and second media gateways in a communications network, wherein each media gateway is arranged to autonomously transition between VoIP and FoIP without the intervention of a media gateway controller.

According to another aspect of the invention there is provided a communications network in which voice over IP (VoIP) and fax over IP (FoIP) calls can be established between media gateways via an Internet Protocol (IP) network, wherein each media gateway is arranged to autonomously transition, subsequent to call establishment, between VoIP and FoIP without the intervention of a media gateway controller.

This invention provides a mechanism for call set up and for transitioning between a VoIP call and a FoIP call by media gateways (MG) that support a fax protocol such as T.38 without the real-time intervention of a Media Gateway Controller (MGC). The only involvement of the MGC is during initial connection capabilities negotiation between the media gateways. At this initial connection stage, both the media gateways and the media gateway controller are unaware of the type of connection, (i.e. Voice, Fax, Modem, etc.) that is to be established.

The advantages of implementing the autonomous transitioning method are:

i) A reduction of the processing load of the media gateway controller, If the media gateways, during the initial capabilities negotiation, have accepted that they mutually support T.38 and have agreed on mutual set of T.38 options, then by allowing the media gateway to autonomously transition to T.38, on detection of the relevant facsimile tones (CNG or V.21 preamble), this avoids the need for message exchange between the media gateway and the media gateway controller indicated in III.2.1 (sequence numbers 8 to 18) or in Rec. H.323 Annex D. Hence reducing the amount of processing load on the media gateway controller.

ii) By permitting the media gateways to autonomously discriminate the various tones, in order to transition between VoIP and FoIP, this allows an H.248 media gateway to interoperate with other non-H.248 media gateways, and between H.248 media gateways and a media gateway controller that does not support the H.248 IP Fax package of Rec. H.248 Annex F.

Reference is here directed to the International Telecommunications Union ITU-T T38, H323 and H248 Standards, the contents of which are incorporated herein by reference.

In the following description, the term fax over IP (FoIP) refers to transporting facsimile control and image data over the IP network using the facsimile IP transport protocol defined in "ITU-T Recommendation T.38". However, it will be understood that the technique may be equally applicable to other facsimile IP transport protocols.

BRIEF DESCRIPTION OF THE DRAWINGS

An embodiment of the invention and the best known method of putting the invention into practice will now be described with reference to the accompanying drawings in which:

FIG. 3b is an explanatory key associated with the state diagram of FIG. 3a;

DESCRIPTION OF PREFERRED EMBODIMENT

Figure 1:
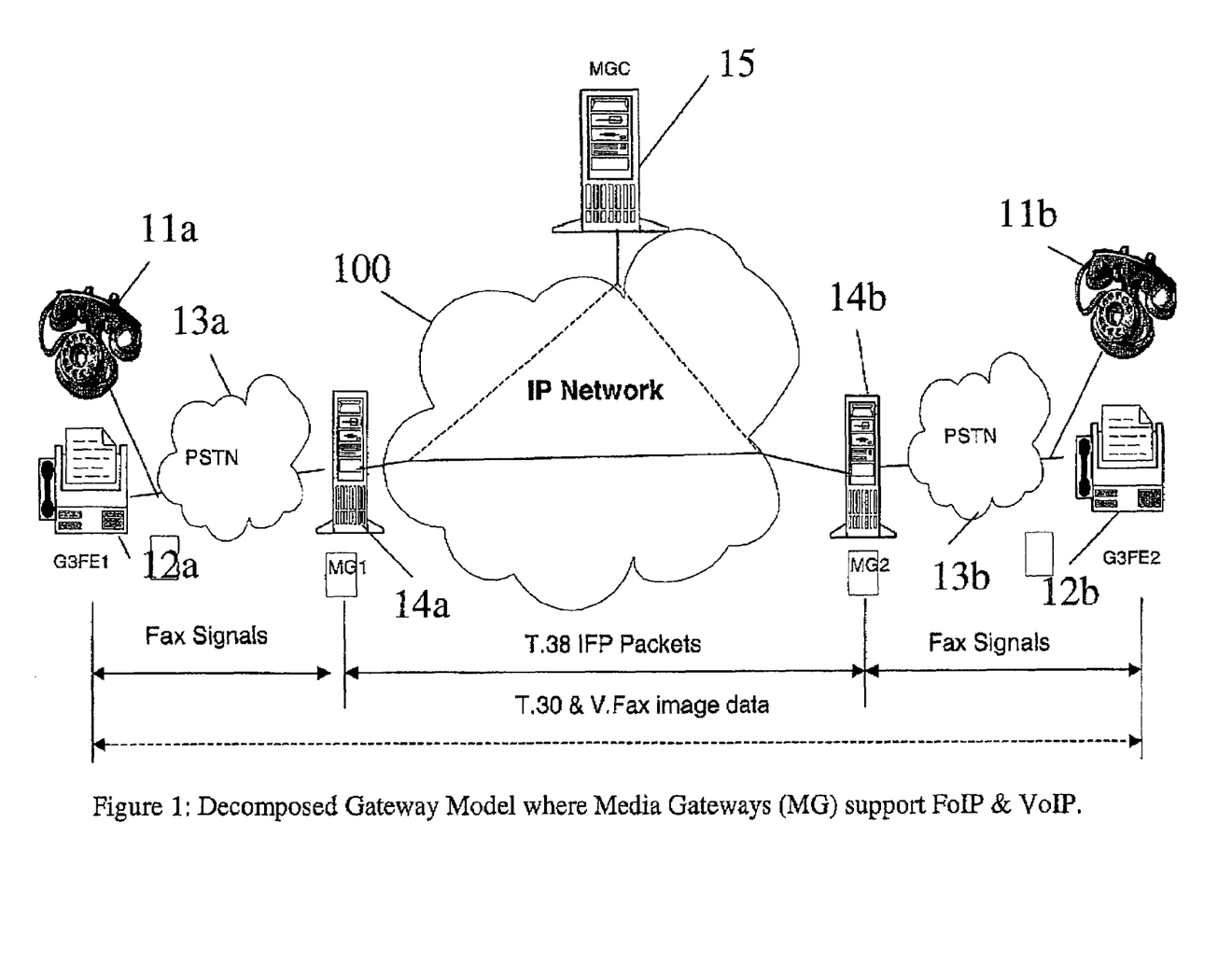
FIG. 1 is a schematic diagram of an example of a communications network according to a preferred embodiment of the invention.

Referring first to FIG. 1, this shows in schematic form a communications network according to a preferred embodiment of the invention. In the network of FIG. 1, communications traffic is transported between voice terminals 11a, 11b and between fax terminals 12a, 12b via an IP (Internet Protocol) network 100. The terminals 11a, 11b, 12a, 12b are connected e.g. via respective local exchanges (not shown) to respective PSTNs (public/private switched networks) 13a, 13b. It will of course be appreciated that the PSTNs may comprise public or private networks.

Thus, continuing with FIG. 1, each PSTN is interfaced to the IP network 100 via a respective media gateway 14a, 14b under the control of a media gateway controller 15. Control of the media gateways by the media gateway controller is required only for the initial call set up, and thereafter any transitioning between VoIP and FoIP call modes is performed by the gateways without further reference to the media gateway controller. It will of course be appreciated that although, for the purposes of explanation, only two media gateways are depicted in FIG. 1, a typical network will incorporate a significant number of such gateways under the control of one or more media gateway controllers 15. Also, a large network may incorporate more than one media gateway controller.

To use the autonomous transitioning method, the media gateways mutually agree to do so at the start of the call. Each media gateway negotiates at the start of the call all possible media descriptors; thus an audio descriptor and an image/T38 descriptor are both included (to indicate support of autonomous transitioning between voice and fax.

Figure 2:
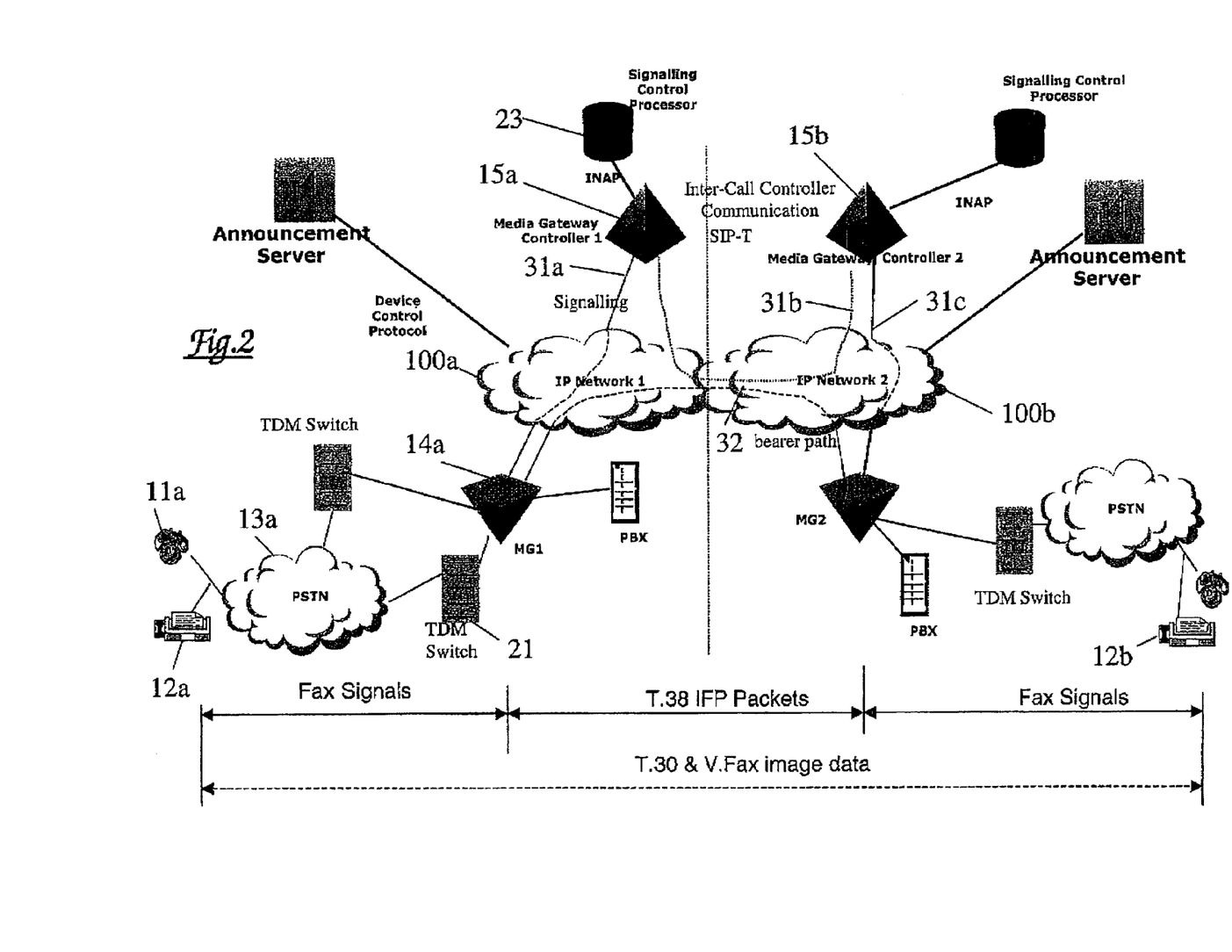
FIG. 2 shows the network of FIG. 1 in further detail.

Referring now to FIG. 2, this shows the construction of the network of FIG. 1 in further detail and also illustrates the signalling paths. As shown in FIG. 2, the media gateways 14a, 14b also function as signalling gateways, although it will of course be appreciated that separate signalling gateways (SGW) may be employed. In addition to interfacing with a PSTN, the media gateways may also provide access from private networks e.g. via PBX 22. To set up a call between a terminal 11a or 12a to a remote terminal 11b or 12b in the arrangement of FIG. 2, the calling terminal sends the number of the called terminal via PSTN 13a and TDM switch 21 to media gateway 14a. In its role as a signalling gateway, the media gateway 14a sends a call setup request to its media gateway controller 15a over a signalling path 31a. The media gateway controller 15a determines from signalling control processor 23 the location of the media gateway controller (15b) which controls the media gateway 14b providing access to the called terminal, and sends a corresponding signalling message over signalling paths 31b, 31c to that media gateway to set up the call (initially as a voice connection) over bearer path 32. If the called terminal is associated with the same IP network as the calling terminal, only one media gateway will then be involved in the signalling and call setup process.

In the network of FIGS. 1 and 2, the media gateways 14a, 14b use SDP (Session Description Protocol, defined in IETFs RFC 2327) to exchange capabilities and indicate support for the autonomous transitioning method by including in the first SDP message to be exchanged at least one media descriptor (i.e. "m= . . . " lines), of type audio and one media descriptor of type image/t38, in which the port number is not set to zero (this is for compatibility with SIP terminals, for which setting the port to zero means non-support of that media type). This is illustrated in the following two examples of messaging sequences between the media gateways and the media gateway controller, which only show the SDP (Session Description Protocol) portion and in which the media line is highlighted in bold type:

SDP Examples Illustrating Support of Autonomous Transitioning:

---

Example 1:

v=0
c=IN IP4 124.124.124.222
m=audio 2222 RTP/AVP 0
( . . . Additional attributes maybe included)
m=image 4444 udptl t38
a=T38FaxVersion:1
a=T38FaxRateManagement:transferredTCFlocalTCF
a=T38FaxUdpEC:t38UDPFEC
a=T3FaxMaxBufferSize:2000
a=T38MaxDatagram:512
a=T38FaxMaxRate:14400
( . . . additional attributes may be included)
Example 2:

v=0
c=IN IP4 124.124.124.222
m=andio 2222 RTP/AVP 0 8 13
a=ptime:20
( . . . additional attributes maybe included)
m=audio 1111 RTP/AVP 18 129
a=ptime10
a=rtpmap: 129 telephone-event/8000
a=fmtp:129 0-15
( . . . additional attributes may be included)
m=image 4444 udptl t38
a=T38FaxRateManagement:transferredTCFlocalTCF
a=T38FaxUdpEC:t38UDPFEC
( . . . additional attributes may be included)
By way of comparison, the following examples 3 to 5 illustrate call setupsequences in which at least one of the gateways does not support autonomous transistioning.
SDP Examples illustrating non-support of autonomous transitioning:
Example 3:

v=0
c=IN IP4 124.124.124.222
m=audio 2222 RTP/AVP 0 8 13 140
a=ptime:20
a=rtpmap:140 telephone-event/8000
a=fmtp:140 0-15
( . . . additional attributes may be included)
m=image 0 udptl 128
a=T38FaxRateManagement:transferredTCFlocalTCF
a=T38FaxUdpEC:t38UDPFEC

---

-continued a=T38FaxMaxBufferSize:1536
a=T38MaxDatagram:512
( . . . additional attributes may be included)
Example 4:

v=0
c=IN IP4 124.124.124.222
m=audio 2222 RTP/AVP 0 8 13 140
a=ptime:20
a=rtpmap:140 telephone-event/8000
a=fmtp:140 0-15
( . . . additional attributes may be included)
Example 5:

v=0
C=IN IP4 124.124.124.222
m=image 8190 udptl t38
a=T38FaxVersion:0
a=T38FaxRateManagement:transferredTCFlocalTCF
aT38FaxUdpEC:t38UDPFEC
a=T38FaxMaxBufferSize:2000
( . . . additional attributes may be included)

---

Note that examples 3 and 4 indicate that, at the instance of time the SDP was exchanged the autonomous transitioning method will not be used for the call being set up, as well as indicating that the media gateway that sent the SDP does not support autonomous transitioning (at least at that instance of time). In such case the call will proceed as mandated by the call establishment control protocol being used. This may be, but is not limited to, ITU-T Recommendation H.323, IETF SIP or ITU-T Recommendation H.248. If it is H.248, then the procedures in section E.2.2.1 of ITU-T Recommendation T.38 are used. Also, note that, although in examples 3 and 4 the SDP does not indicate support of T.38, this does not mean that either the media gateway or the media gateway controller cannot request, at a later stage of the calls to transition to T.38 by sending a new SDP (for example within a H.248 Modify command or a SIP INVITE command) containing a media attribute of type image/t38 (as described either in Rec. T.38 Annex D or in section E.2.2.1 of T.38 Annex E.).

The message sequence of Example 5 causes both media gateways to immediately transition to FoIP (using T.38). However any future transitioning to any other mode of operation (e.g. voice, voice band data, etc.) will be controlled by the media gateway controller.

In our arrangement and method, an H.323 capable media gateway indicates support of autonomous transitioning during the H.245 capabilities exchange by opening two parallel channels in each direction, one for voice, the other for fax (T.38), as described in ITU-T Recommendation H.323 Annex D.3 for fastStart or Annex D.4 for non fastStart. Two media gateways that mutually support autonomous transitioning, on detection of the appropriate facsimile signals or on reception of a UDP (or TCP) packet at its T.38 UDP (or TCP) port, mute the audio channel and transition to the T.38 channel to proceed with the fax call.

The media gateway controller decides, at the start of the call which method to use (i.e. whether to control the transitioning from audio to facsimile or to allow the media gateways to transition autonomously), based on data derived from capability messages exchanged as described above) between the media gateways. Hence, if the two media gateways that are establishing the connection have mutually indicated that they support autonomous transitioning (by the means described above), then the media gateway controller is not required to control any subsequent transition between VoIP and FoIP. Note than in H.323 fastStart, there is no explicit negotiation of which method to use, autonomous or MGC-based. The fastStart element indicates that the call is either a pure voice call (which may turn out eventually to be switched to a T.38 call using H.323 Annex D.5), or it may consist of a separate channel for voice and a separate channel for T.38 as per H.323 Annex D.3. The latter is used by an MGC as indication that the media gateways will use autonomous transitioning. When non-fastStart procedures are used, the terminal capability negotiation will indicate if T.38 and voice can be used simultaneously or not. The terminal capability negotiation procedures may also be used after a faststart call set-up, and will be instrumental in indicating that the autonomous or switchover procedures are supported.

Absence of a media gateway indicating support of autonomous transitioning is construed, by both the MGs and the MGCs, as an indication to use the existing call establishment procedures which depend on the call control protocol being used (SIP, H.323 or H.248), and which can be one of the following:

T.38 MGC method (for H.248) described in section E.2.2.1 of ITU-T Recommendation T.38, The method described in Rec. T.38 Annex B/H.323

The procedure described in Rec. T.38 Annex D/SIP-SDP.

To use the autonomous transitioning method the media gateways mutually agree to do so at the start of the call by exchanging capabilities as described above.

The media gateway negotiates at the start of the call all possible media descriptors; thus an audio descriptor and an image/T38 descriptor would both be included. Also, T.38 options of a subsequent fax phase to the call are negotiated at the same time as the audio parameters.

Note that for the case of using ITU-T Recommendation H.248 call set-up procedures, the fact that both MGs may have indicated in the audit that they support T.38 as well as audio (and responded with two media descriptor lines), is not used as an indication of support of the autonomous transitioning method. It is in the creation of a context where such support is indicated as will be described below. Hence, the H.248 MGC includes both an audio and an image descriptor in the Local descriptor portion of the Add Ephemeral command (refer to III.2.2.3), with the port numbers set to $. However, if for some reason, (e.g. lack of resources) both audio and image resources cannot be reserved at the time of the start of the call, the image media descriptor, within the response SDP, either has its audio port set to zero (recommended for compatibility with SIP capable terminals) or is omitted altogether, thus indicating non-support of autonomous transitioning as well as initialising the call as voice.

Voice and Facsimile Connection

To set up the connection between terminals, digits output by the calling terminal are collected by the respective media gateway (MG) and sent to the calling agent to invite the called party to a voice connection as defined in ITU-T H.248. Because at this stage of the call the media gateway controller and the media gateways have no indication whether a call is going to be voice or facsimile, a voice connection is set up and no T.38 packets are sent. The media gateways remain in this voice mode until they detect such criteria as will be described below that cause them to determine that a fax call is starting. At this point the media gateways enable the image/T38 connection and mute the audio connection. The media gateways then remain in fax mode until they detect such criteria that cause them to determine that the fax transmission is complete, at which point they mute the image/T38 connection and re-enable the audio/RTP connection. This process may continue indefinitely until the call is terminated. The criteria resulting in autonomous transitioning between voice and fax are described below.

VoIP to FoIP Autonomous Transition Criteria

Upon detection of fax calling tone (CNG) by the emitting media gateway (MG), that gateway can determine with sufficient confidence that it is a facsimile call because a CNG tone is sent only by a G3FE terminal. Hence, it a T.38 capability has been mutually successfully negotiated between the media gateways, the media gateway switches or transitions to T.38 and, in accordance with the T.38 protocol, transmits to the remote media gateway the T.38 CNG indicator packet. The remote media gateway also transitions to T.38 on receipt at its T.38 UDP (or TCP) port, of the T.38 CNG indicator packet.

When in audio/RTP mode, receipt of any T.38 packet, at a designated T.38 UDP (or TCP) port, is a criterion for switching or transitioning from the VoIP mode to the image/T38 mode. A preferred method is that in which, receipt at its local T.38 UDP (or TCP) port of a valid UDP (or TCP) packet whose source IP address corresponds with that of the remote media gateway, with which the agreed use of autonomous transitioning (as well as the T.38 capabilities) was mutually successfully negotiated, can be assumed to be a T.38 packet (because only T.38 UDPTL packets must be sent to negotiated image/t38 UDP port number) and hence cause autonomous transitioning to T.38. This similarly applies for T.38 TCP packets. The T.38 UDP (or TCP) port is activated only it autonomous transitioning (and a mutual set of T.38 capabilities) is supported by the media gateways establishing the call. This avoids falsely transitioning autonomously to T.38 on receipt of any valid UDP packet if autonomous transitioning is not mutually supported between the media gateways.

Media gateways that are operating with the autonomous method should preferably not rely solely on detection of the CNG tone, as this tone is mandatory only for automatic G3FE fax terminals and manual G3FE fax terminals conforming to post-1993 version of Rec. T.30.

If a CNG tone is not present then the media gateways transition to T.38 on detection of the V.21 preamble, which is sent by all G3FE fax terminals except V.34 G3FEs. V.34 facsimiles use V.8 signals that will have to be detected by the MG in order to support the proposal of ITU-T Study Group 16 Question 14. The T.38 protocol proceeds with a T.38 V.21 flags indicator packet, The emitting media gateway, on receipt of the T.38 V.21 flags indicator packet, will transition to T.38.

Detection of the call function set to facsimile within the V.8 signals CI/CM/JM also indicates transition to image/T38 mode and application of ITU-T Study Group 16 Question 14.

FoIP to VoIP T.38 Autonomous Transition Criteria

The media gateways autonomously transition from fax (image/T38 connection) to a voice (audio/RTP connection) when they detect one of the following:

a. Detection of a T.30 DCN message. Following detection of the T.30 DCN message the media gateway transmits the corresponding T.38 packet and subsequently transitions to voice. Following receipt of T.38 T.30 CDN packet, the media gateway will play out the T.30 DCN and subsequently transition to voice.

b. Detection of bi-directional silence. It is recommended that a media gateway transitions back to voice mode after detecting more than about 7 sec. of bi-directional silence.

c. Receipt from the media gateway controller of an appropriate command modifying the call to audio. A H.248 Modify, a SIP INVITE command in which only the audio descriptor is present or the appropriate messages as per H.323 annex D.5 can do this.

Figure 3A:
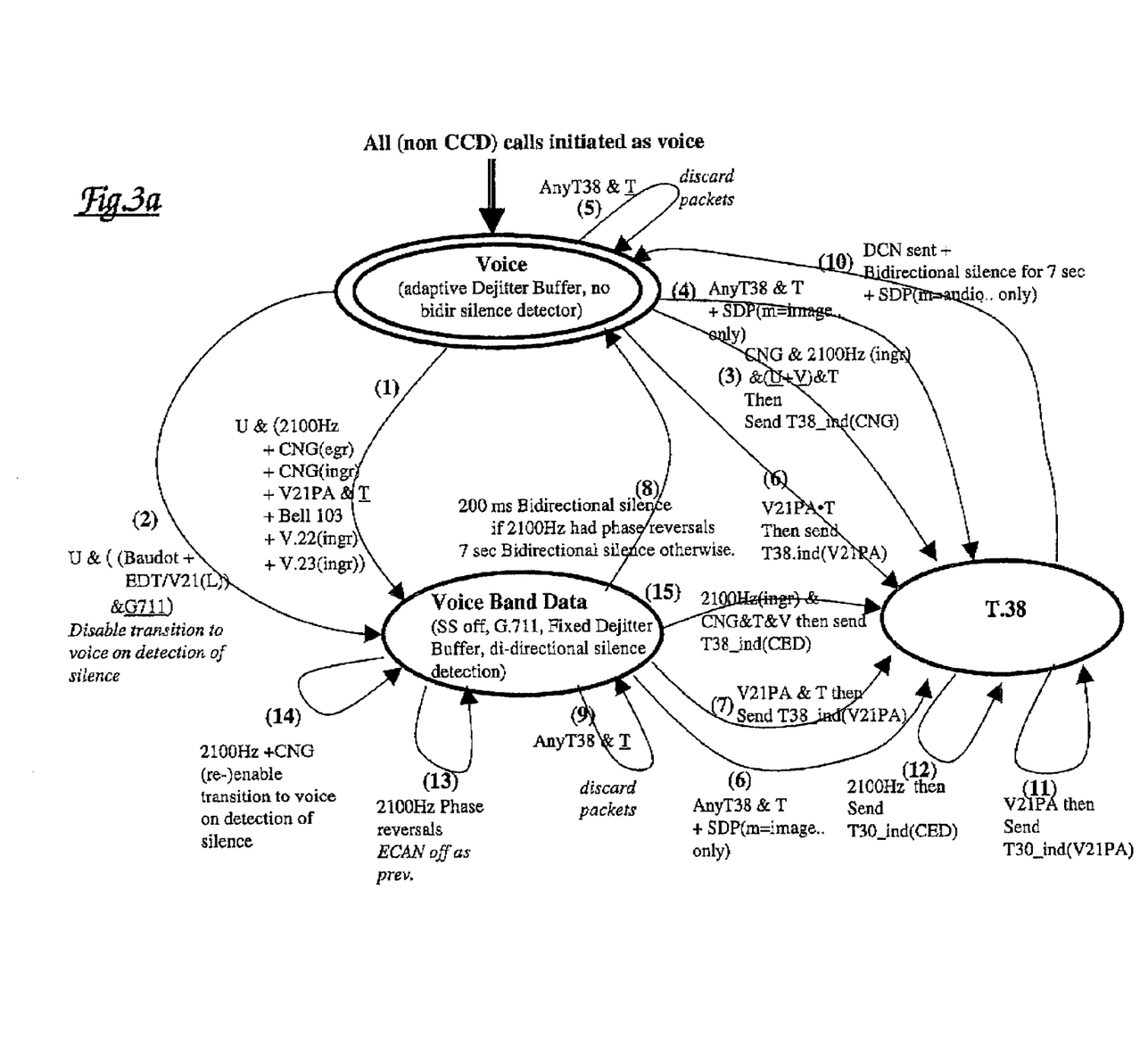
FIG. 3a is a state diagram illustrating the autonomous transitioning of a media gateway between voice and fax modes.
Figure 4:
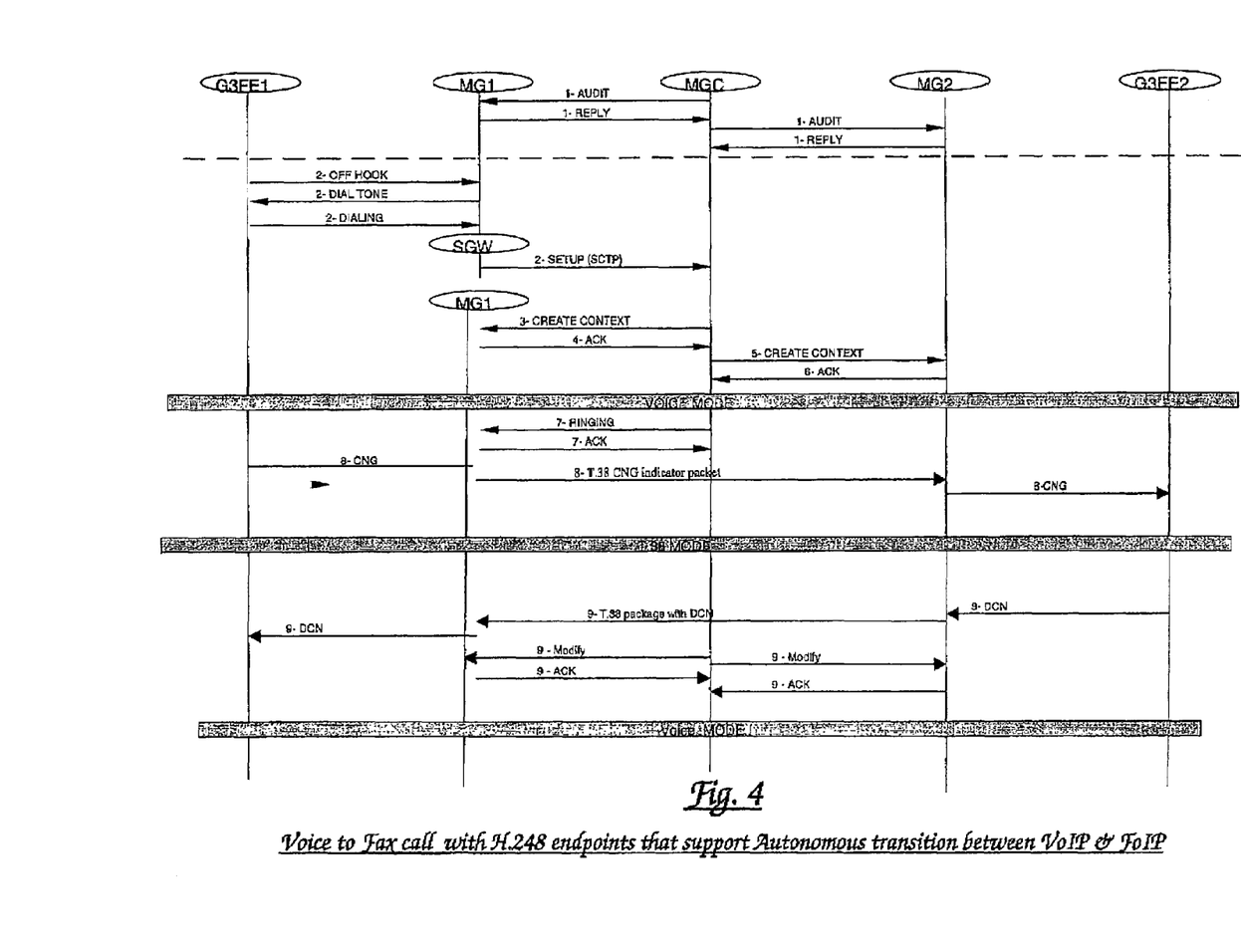
FIG. 4 is a call flow chart illustrating a voice to fax call set up procedure.

Voice to Fax Call Setup with H.248 Endpoints that Support the T.38 Autonomous Method Referring now to the state diagram of FIG. 3a together with the key of FIG. 3b and the flow chart of FIG. 4, these figures illustrates a preferred call set up process. This call flow example describes a voice call that originates and terminates in the switched circuit network (SCN) or PSTN and is transported through the packet network 100. The packet network signalling in this example is not specified but any signalling protocols such as H.323 or SIP can be used as will be understood by those skilled in the art. The purpose of this example is to describe media gateway/media gateway controller interactions when operating in the autonomous transitioning mode including indication to use the autonomous transitioning mode, the detection of fax and switching from voice to fax.

As will be apparent from the state diagram of FIG. 3a and the flow chart of FIG. 4, the following sequence takes place.

i) At some point before a call, the media gateway controller (MGC) will have issued an audit capabilities command to the media gateways (MG1 & MG2) under its control and will know what the voice and fax capabilities are for each of those gateways. In the scenarios described below, if both media gateways support T.38, then this is the preferred mode for IP fax operations. In the event that one or both media gateways do not support T.38, then the fax call may proceed over the IP voice channel. However, since T.30 facsimile may fail over a compressed voice codec, it would be preferable to use a G.711 codec for communication between the media gateways. 'W-' is used to indicate that a wild-carded answer with a logical union of information on all terminations on the media gateway is requested, not an audit of each termination on the media gateway. Note that media gateway MG1 indicates to the media gateway controller that it supports T.38, but because the port is set to '$' this audit is not used to indicate support of autonomous transitioning.

The following messaging sequence takes place:
The media gateway controller audits media gateway MG1.
MGC to MG1:

```
        MEGACO/1.0 [123.123.123.4]:55555
        Transaction = 10 {
                Context = -{W-AuditCapability = *{Audit{Media,
                Packages}}}
        }
media gateway MG1 replies. MG1 to MGC:
        MEGACO/1.0 [125.125.125.111]:55555
        Reply = 10 {
                Context = -{
                    AuditCapability = * {
                        Media {
                            Stream = 1{
                                Local {
  v=0
  c=IN IP4 $
  m=audio $ RTP/AVP 0
  v=0
  c=IN IP4 $
  m=image $ udptl 138
                                }; RTP profile for G.711 is 0, t38 is T.38
                            }
        },
        Packages {al, rtp, ipfax, fax, ctyp, cg}
        ; al = analog line pkg, rtp = rtp pkg, ipfax = T.38 fax pkg,
        fax = fax pkg
        ; ftmd = fax/textphone/modem tones detection
        pkg
        ; ctyp = Call Type Discrimination package)
        ; cg = call progress tones generator pkg
                    }
                }
        }
}
```

A similar exchange takes place between the media gateway controller and media gateway MG2.

ii) The End User decides to send a fax from device G3FE1 and enters the phone number of the destination fax device. The fax device receives dial tone and then dials the phone number. As a result, the central office within the local SCN loop sends an SS7 signalling message to the signalling gateway (SG) which, as discussed above, may be comprised by the media gateway. The SG sends a Setup message to the media gateway controller after receiving this IAM from a SCN switch that conveys the called and calling phone numbers. Sigtran's SCTP carries the SS7 signalling from the SG to the MGC.

iii) From the IAM message, the media gateway controller determines which circuit on which media gateway is involved and where to terminate the call. The end points are found by the media gateway controller (MGC) and it sets up the audio channel between the two media gateways and instructs the SS7 facility of the receiving central office (CO) to connect to the end phone destination, which results in the generation of ringing. So, to start, the controller determines that a connection needs to be made from media gateway MG1 to media gateway MG2. The media gateway controller creates a Context for the call. A TDM termination DS0/1/1, an audio/RTP termination and an image/T38 termination are added to a new context in MG1. Mode is ReceiveOnly since Remote descriptor values are not yet specified. Preferred codecs are in the MGC's preferred order of choice. The media gateway controller sets to $ the fields in the SDP in Local that the media gateway will set itself. Also, in order for the media gateway controller to determine whether both gateways support autonomous transitioning, the media gateway controller instructs media gateway MG1 to respond with the values of both its audio RTP/AVP capabilities and its image/t38 capabilities. The MGC performs this function by setting to $ the ports for both the audio and the image media lines.

The following messaging sequence takes place.

```
MGC to MG1:
        MEGACO/1.0 [123.123.123.4]:55555
        Transaction = 11 {
                Context = $ {
                        Add = DS0/1/1 {
                                Media {
                                        Stream = 1 {
                                        } }
                        }
                        Add = $ {
                                Media {
                                        Stream = 1 {
                                                LocalControl {Mode = ReceiveOnly},
                                                Local {
  v=0
  c=IN P4 $
  m=audio $ RTP/AVP 0
  m=image $ udptl t38
                                                }; IP termination for audio
                                        }
                                }
                        }
                }
        }
``` iv) Media gateway MG1 acknowledges the new Termination and fills in the Local IP address and UDP port. It also makes a choice for the codec based on the list of SDP blocks in Local. MG1 sets the RTP port to, for example, 2222. Because this media gateway supports autonomous transitioning between VoIP and FoIP, it also sets the T.38 port to, for example, 4444 and includes the supported T.38 capabilities If, by way of comparison, the media gateway did not support autonomous transitioning between VoIP & FoIP it would set the T.38 port to 0 or omit the image media descriptor line all together, and would proceed as indicated in FIG. III2.1 of ITU-T Recommendation T.38 Appendix III.

```
MEGACO/1.0 [124.124.124.222]:55555
Reply = 11 {
    Context = 2000 {
        Add =DS0/1/1, ; SCN termination added
        Add = RTP/1 {
            Media {
                Stream = 1 {
                    Local {
v=0
c=IN IP4 124.124.124.222
m=audio 2222 RTP/AVP 4
m=image 4444 udptl t38
a=T38FaxRateManagement:transferredTCFlocalTCF
a=T38FaxUdpEC;t38UDPFEC
                    }; IP termination added
                }
            }
        }
    }
}
``` v) The media gateway controller now associates DS0/2/2 with a new Context on media gateway MG2, and establishes an RTP Stream (i.e. RTP/2/2 will be assigned) and a T.38 stream SendReceive connections through to the originating user, G3FE1. Also, because media gateway MG1 supports autonomous transitioning, the media gateway controller needs to find out whether media gateway MG2 also supports autonomous transitioning For this purpose, the media gateway controller interrogates media gateway MG2 by including a audio media descriptor and an image media descriptor with the ports set to $ in the Add ephemeral of the create context message, as well as indicating that the remote media gateway supports autonomous transitioning.

```
MGC to MG2:
MEGACO/1.0 [123.123.123.4]:55555
Transaction = 30 {
    Context = $ {
        Add = DS0/2/2 {
            Media {
                Stream = 1 {
                    LocalControl {Mode = SendReceive}}},
        }
        },
        Add = $ {
            Media {
                Stream = 1 {
                    LocalControl {Mode = SendReceive},
                    Local {
v=0
c=IN IP4 $
m=audio $ RTP/AVP 0
m=image $ udptl t38
                    },
                    Remote {
v=0
c=IN IP4 124.124.124.222
m=audio 2222 RTP/AVP 0
m=image 4444 udptl t38
a=T38FaxRateManagement:transferredTCFlocalTCF
a=T38FaxUdpEC:t38UDPFEC
                    }; RTP profile for G.711 is 0
                }
            }
        }
    }
}
``` vi) This is acknowledged. Also, because media gateway MG2 supports autonomous transitioning between VoIP and FoIP, it includes in its SDP response both an audio and an image media descriptor with valid port numbers. The RTP stream port number is different from the Megaco/H.248 control port number. In this case it is, for example, 1111 (in the SDP). The T.38 stream port number is different from the Megaco/H.248 control port number. In this case it is, for example, 5555 (in the SDP). Also, from the remote SDP, media gateway MG2 knows that it is required to transition between VoIP & FoIP. If the remote SDP did not have both the audio and an image media descriptor, MG2 would have defaulted to using the T.38 MGC method (described in ITU-T Recommendation T.38 Annex E) for transitioning from an audio/RTP connection to an image/t38 connection and the procedures of section III.2.1 of ITU-T Recommendation T.38 Appendix III shall follow.

In this example the following messaging sequence takes place:
MG2 to MGC:

```
MEGACO/1.0 [125.125.125.111]:55555
Reply = 30 {
    Context = 5000 {
        Add = DS0/2/2,
        Add = RTP/2{
            Media {
                Stream = 1 {
                    Local {
v=0
c=IN IP4 125.125.125.111
m=audio 1111 RTP/AVP 0
m=image 5555 udptl t38
a=T38FaxRateManagement:transferredTCFlocalTCF
a=T3BFaxUdpEC:t38UDPFEC
                    }
                }
            }
        }
    }
}
``` vii) The MGC provides the MG2 IPAddress and UDPport to MG1, as well as indicating to MG1 that MG2 supports autonomous transitioning for transitioning between VoIP & FoIP. Also ringing tone ringback is applied to the DS0/1/1 termination which is changed to SendReceive.

```
MGC to MG1:
MEGACO/1.0 [123.123.123.4]:55555
Transaction = 12 {
    Context = 2000 {
        Modify = DS0/1/1 {
        Signals {cgal/rtri}}, ;apply ringing tone
        Modify = RTP/1 {
            Media {
                Stream = 1 {
                    LocalControl {Mode = SendReceive },
                    Remote {
v=0
c=IN IP4 125.125.125.111
m=audio 1111 RTP/AVP 0
m=image 5555 udptl t38
a=T38FaxRateManagement:transferredTCFlocalTCF
a=T38FaxUdpEC:t38UDPFEC
                    }
                }
            }
        }
    }
}
from MG1 to MGC:
MEGACO/1.0 [124.124.124.222]:55555
Reply = 12 {
    Context = 2000 {Modify = DS0/1/1, Modify = RTP/1}
}
``` viii) MG1 acknowledges, and transitions autonomously from an audio/RTP connection to an image/t38 connection.

ix) The calling fax machine (G3FE1) typically will start to generate CNG calling tones. It is envisioned that the first Media Gateway (MG1) will detect the CNG tone event and will determine that a facsimile call is commencing. Hence, MG1 will switch to image/T38 mode, mute its audio/RTP connection and transmit (via its image/T38 connection) to MG2 the T.38 CNG indicator packet. MG2 on receipt of the T.38 CNG indicator packet will transition to image/T38 mode. This may be implemented such that, receipt at its T.38 UDP port of a valid IP/UDP packet whose source IP address corresponds to that of MG1 can be assumed to be a T.38 packet causing a transition to T.38. Hence, on transition to image/T.38 mode, this packet will be decoded and analysed to be of type CNG, thus playing out the appropriate CNG tone. In order to avoid any UDP packet that arrives at the T.38 UDP port, this port should be activated only if mutual agreement to use autonomous transitioning was successfully negotiated before the call. From here on, both MGs will operate in accordance with ITU-T Recommendation T.38.

x) The media gateways revert back to the audio/RTP connection (VoIP) based on detection of any of the following:
   a. Detection of a T.30 DCN message
   b. Detection of bi-directional silence. It is recommended to detect transition back to voice mode on detection of more than 7 sec of bi-directional silence to allow for the T.30 T2 timers (within the G3FEs) to time-out.
   c. Reception of a Modify command in which only an audio media descriptor is present.

Voice to Fax Call Set-up Between H.248 and H.323 Endpoint that Support the T.38 Autonomous Method.

Figure 5:
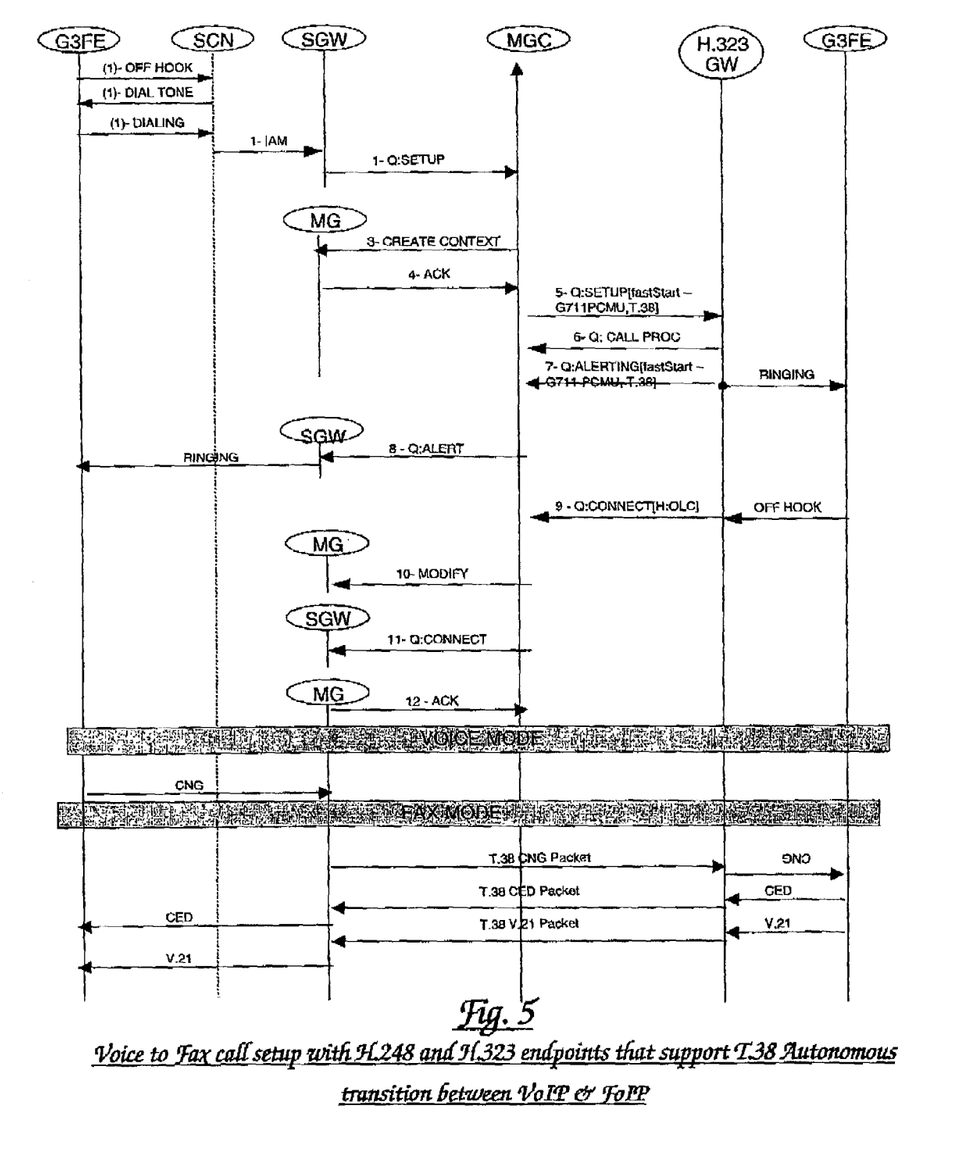
FIG. 5 is a call flow chart illustrating a further voice to fax call set up procedure.

Referring now to the flow chart of FIG. 5, this illustrates a Voice to Fax call set-up between H.248 and H.323 endpoints. This facsimile call flow example describes a facsimile call that originates in the SCN and is terminated in the packet network. The packet network signalling in this example is H.323 Annex D.3 but other signalling protocols such as SIP can be used, the purpose of the example is to describe MG/MGC interactions.

The assumption is made that the signalling between the signalling gateway (SGW) and MGC is based on Q.931. This does not of course indicate that no other signalling can be used on this interface. Capabilities described here are generic line package descriptions (but could also be SDP or H.245 messages).

The media gateway and the H.323 endpoint are configured for voice and fax. The purpose of the example is to describe MG/MGC & H.323-endpoint/MGC interactions when operating in the autonomous transitioning mode including an indication to use the autonomous mode on the detection of fax and switching from voice to fax.

1. The SGW (signaling gateway) sends a Set-up message to the MGC after receiving an IAM from a SCN switch.
2. From the IAM message, the MGC infers which circuit on which MG is involved and where to terminate the call.
3. The MGC creates a Context for the call. The Context contains two terminations: one for the SCN side and one for the packet side. Also, in order for the to MGC to infer whether both gateways support autonomous transitioning or T.38 MGC method, the MGC instructs MG1 to respond with the values of both its audio RTP/AVP capabilities and its image/t38 capabilities:

```
MGC to MG1:
    MEGACO/1.0 [123.123.123.4]:55555
        Transaction = 11 {
            Context = $ {
                Add = DS0/1/1 {
                    Events = 1 {al/on, ftmd/dtfmctyp/dtone,
                        faxctyp/dtone{dtst=cng},
                faxctyp/dtone{dtst=cedans},ctyp/dtone, ctyp/dtone{dtt=cng},
                ctyp/dtone(dtt=ans}, ctyp/dtone{dtt=v21flag},
                fax/faxconnchange, al/of}
                        }, ; the SCN side termination listening for call type
                            indicating tones
                Add = $ {
                    Media {
                        Stream = 1 {
                            LocalControl {Mode = ReceiveOnly},
                            Local {
    v=0
    c=IN IP4 $
    m=audio $ RTP/AVP 18
    v=0
    c=IN IP4 $
    m=audio $ RTP/AVP 0
    m=image $ udptl t38
                            }; the IP side termination showing
                            capability of RTP audio with PT 0
    and 4.
                        }
                    }
                }
            }
        }
```

4. The MG accepts the Context creation and fills in the unknown ($) parameters. The MG supports autonomous transitioning, hence it includes the image media line with an appropriate port number in the response:

```
MEGACO/1.0 [124.124.124.222]:55555
    Reply = 11 {
        Context = 2000 {
            Add = DS0/1/1,; the SCN termination is accepted
            Add = RTP/1 {
                Media {
                    Stream = 1 {
                        Local {
    v=0
    c=IN IP4 124.124.124.222
    m=audio 2222 RTP/AVP 0
    m=image 5555 udptl t38
}; the IP RTP termination is accepted with audio payload type 0. Also,
the MG indicates that it supports the T.38 Autonomous method for
transitioning between VoIP and FoIP.
                    }
                }
            }
        }
    }
```

This shows how the MG reports to the MGC which parameters it has filled in.

5. The MGC sends a Setup message to the destination endpoint, here assumed to be a H.323 endpoint (terminal, GW, . . . ). Also, because it knows that the MG supports autonomous transitioning, it indicates this in the fastStart element by the capability of simultaneous support of at least one audio Codec and of receiving and transmitting T.38 FoIP.
6. The H.323 endpoint sends a CallProceeding message followed by an Alerting message with fastStart back to the MGC, informing it that it supports autonomous transitioning by indicating its capability of simultaneous support of at least one audio Codec and of receiving and transmitting T.38 FoIP.

7. The MGC sends an Alerting message to the SGW.
8. The MGC sends a Modify command to the MG to set the mode and remote termination description on the packet side:
9. The called endpoint at some instance sends a Connect message to the MGC once the G3FE terminal goes off hook. Note that this message contains both the audio and facsimile capabilities and does not include a H.245 port.
10. A Modify command is sent to the MG to change the mode of the SCN side termination to SendRecv as well as the remote endpoints audio and fax capabilities are also included in this command (this information was included in the Connect from the H.323 endpoint). This also indicates that the remote endpoint supports autonomous transitioning and that the call is to be initially be set up as a voice call:

```
MGC to MG:
    MEGACO/1.0 [123.123.123.4]:55555
       Transaction = 30 {
          Context = $ {
             ModifyAdd = DS0/1/1 {
                Media {
                   Stream = 1 {
                      LocalControl {fax/faxstate = Prepare }}},
                Events = 10 {al/of,
       fax/faxconnchange },; the MGC request the MG to send
       it an event when it transitions to T.38.
                Signals = (al/ri, ctyp/callsig}
             }; modify SCN termination to reflect that we are connected
       through
                Modily = RTP/1 {
                   Media {
                      Stream = 1 {
                         Local {
          v=0
          c=IN IP4 124.124.124.222
          m=audio 1111 RTP/AVP 0
          m=image 2222 udptl t38
          a=T38FaxRateManagement:transferredTCF
          a=T38FaxUdpEC:t38UDPFEC
                         }; modify media stream 1 to use image
                         media, udptl transport for T38
                         LocalControl {Mode = SendReceive,
                            ipfax/faxstate=Prepare,
                            ipfax/trpt=T38UDPTL
                         }
                      }
                   }
                   Events = 2 {ipfax/faxconnchng}
                }
             }
          }
       }
```

11. The MGC sends a Connect message to the SGW to indicate the call is connected.
12. The MG accepts the Modify commands:

```
from MG to MGC:
    MEGACO/1.0 [124.124.124.222]:55555
       Reply = 14 {
          Context = 2000 {
             Modify = RTP/1 {
                Media {
                   Stream = 1 {
                      Local {
          v=0
          c=IN IP4 124.124.124.222
          m=audio 2222 RTP/AVP 0
          m=image 3333 udptl t38
          a=T38FaxRateManagement:transferredTCF
          a=T38FaxUdpEC:t38UDPFEC
                      }; The fax udptl/t38 transport channel is accepted
                         on the IP session and
                      the autonomous method shall be used for transtioning between
                         VoIP and FoIP
                      }
                   }
                },
                Modify = DS0/1/1
             }; The modify is accepted on the DS0 session
          }
```

At this point the call proceeds in Voice mode between the gateways. The MGC, knows from the responses from both gateways that the autonomous method is to be used by both gateways for transitioning between VoIP and FoIP. Typically, the originating G3FE terminal would send a CNG tone, at which point the originating gateway will mute its audio/RTP port and transition to FoIP mode and send over the IP network the corresponding T.38 T.30_Indicator(CNG) packet. Because the destination gateway received the UDP packet at its UDP port that has been assigned for T.38, it assumes that it is a T.38 packet and that it must transition to T.38 mode. From here on both gateways will operate in accordance with Rec. T.38. The gateways revert back to the audio/RTP connection (VoIP) based on detection of any of the following:
   Detection of a T.30 DCN message
   Detection of bi-directional silence. It is recommended to detect transition back to voice mode on detection of more than 7 sec of bi-directional silence to allow for the T.30 T2 timers (within the G3FEs) to time-out.

It will be understood that the above description of a preferred embodiment is given by way of example only and that various modifications may be made by those skilled in the art without departing from the spirit and scope of the invention.

COPYRIGHT NOTICE

A portion of the disclosure of this patent document contains material which is subject to copyright protection. The copyright owner has no objection to the facsimile reproduction of the patent document as it appears in the Patent and Trademark Office files and records, but otherwise reserves all copyright rights.

The invention claimed is:
1. A method of autonomously transitioning between voice over internet protocol (VoIP) and fax over IP (FoIP) during a call in a communications packet based network, the method comprising the steps of: reserving via a media gateway controller two co-existing communication resources between first and second media gateways for said call, one a VoIP communication resource and the other a FoIP communication resource, establishing the call initially as a voice call over the VoIP communication resource, and, on a determination by the media gateways that a facsimile call is required, autonomously transitioning from VoIP to FoIP by muting said VoIP communication resource and enabling said FoIP communication resource; wherein, prior to establishment of the call, said media gateways exchange capabilities indicating support of autonomous transitioning from VoIP to FoIP and wherein autonomous transitioning of a media gateway from VoIP to FoIP is triggered by receipt of one of a fax tone signal and a FoIP packet without any intervention by the media gateway controller or any renegotiation of the FoIP communication resource.

2. A method as claimed in claim 1, wherein said FoIP packet for triggering autonomous transitioning comprises a T.38 packet.

3. A method as claimed claim 1, wherein said two co-existing communication resources comprise co-existing but separate channels.

4. A method of autonomously transitioning voice over IP (VoIP) calls and facsimile over IP (FoIP) calls between first and second end terminals via first and second media gateways in a communications network, comprising the step of: reserving via a media gateway controller two co-existing communication resources between the first and second media gateways for said call between the first and end second terminals, one a voice over IP communication resource and the other a facsimile over IP communication resource, wherein each media gateway is arranged to autonomously transition between respective VoIP and FoIP communication resources without the intervention of the media gateway controller, wherein, prior to establishment of a call, said media gateways exchange capabilities indicating support of autonomous transitioning from VoIP to FoIP.

5. A method of establishing a call between first and second end terminals via first and second media gateways in a communications network, said gateways each being capable of autonomous transitioning between a voice over IP (VoIP) communication resource and a co-existing facsimile over IP (FoIP) communication resource, the method comprising the steps of: establishing via a media gateway controller a bearer path for the call between the first and second media gateways for said call between the first and second end terminals, said bearer path comprising said two co-existing communication resources, exchanging between the media gateways confirmation of each gateway's capability to perform autonomous transitioning between VoIP and FoIP, establishing the call as a VoIP call on the VoIP communication resource, and wherein, on a determination by the media gateways that a facsimile call is required, each media gateway autonomously transitions between VoIP and FoIP without the intervention of the media gateway controller.

6. A method as claimed in claim 5, wherein said determination that a facsimile call is required is made by the media gateways on detection thereat of a facsimile tone signal or a FoIP packet.

7. A method as claimed in 6, wherein each said media gateway transitions from its FoIP channel to its VoIP channel after a predetermined period of transmission silence.

8. A non-transitory computer readable storage medium storing a software program to perform the method of claim 1.

9. A communications network apparatus comprising a first end terminal and a second end terminal, in which voice over IP (VoIP) and fax over IP (FoIP) calls can be established between the first and second end terminals via media gateways and via an Internet Protocol (IP) network, wherein said media gateways are arranged to establish two co-existing communication resources between said media gateways for said call between the first and second end terminals, one a voice over IP communication resource and the other a facsimile over IP communication resource and to autonomously transition, subsequent to call establishment, between VoIP and FoIP without the intervention of a media gateway controller, wherein, prior to establishment of a call, said media gateways are arranged to exchange capabilities indicating support of autonomous transitioning from VoIP to FoIP.

10. A communications network apparatus as claimed in claim 9, wherein autonomous transitioning of a media gateway from VoIP to FoIP is triggered by receipt of one of a fax tone signal and a FoIP packet.

11. A communications network apparatus as claimed in claim 10, wherein said FoIP packet for triggering autonomous transitioning comprises a T.38 packet.

12. A media gateway for establishing voice and facsimile calls over an Internet Protocol (IP) network for a call between a first end terminal and a second end terminal, the gateway being arranged to establish with another media gateway two co-existing communication resources between said gateway and said another gateway for the call between the first and second end terminals, one a voice over IP communication resource and the other a facsimile over IP communication resource and to autonomously transition between VoIP and FoIP without the intervention of a media gateway controller, wherein, prior to establishment of a call, said media gateway is arranged to exchange capabilities indicating support of autonomous transitioning from VoIP to FoIP with said other media gateway.

13. A media gateway as claimed in claim 12, and arranged to transition from its VoIP channel to its FoIP channel on receipt of a facsimile tone signal or a FoIP packet.

14. A media gateway as claimed in claim 13, and arranged to transition from its FoIP channel to its FoIP channel after a predetermined period of transmission silence.

* * * * *